United States Patent [19]
Witte

[11] Patent Number: 4,563,090
[45] Date of Patent: Jan. 7, 1986

[54] GRATING SPECTROMETER

[75] Inventor: Wolfgang Witte, Uberlingen, Fed. Rep. of Germany

[73] Assignee: Bodenseewerk Perkin-Elmer & Co., GmbH, Uberlingen, Fed. Rep. of Germany

[21] Appl. No.: 502,991

[22] Filed: Jun. 10, 1983

[30] Foreign Application Priority Data

Jul. 2, 1982 [DE] Fed. Rep. of Germany ....... 3224736

[51] Int. Cl.⁴ .............................................. G01J 3/18
[52] U.S. Cl. ..................................... 356/328; 364/498
[58] Field of Search ............... 356/308, 309, 326, 328, 356/331, 418; 364/498, 526

[56] References Cited

U.S. PATENT DOCUMENTS

| | | | |
|---|---|---|---|
| 3,886,331 | 5/1975 | Schierer, Jr. ........................ | 364/526 |
| 4,158,505 | 6/1979 | Mathisen et al. ................... | 356/323 |
| 4,320,971 | 3/1982 | Hashimoto et al. ................ | 356/328 |
| 4,437,763 | 3/1984 | Kaye .................................... | 356/326 |
| 4,482,966 | 12/1984 | Mito et al. ........................... | 364/498 |

FOREIGN PATENT DOCUMENTS 766909  1/1957  United Kingdom ............... 356/331

Primary Examiner—F. L. Evans
Assistant Examiner—Joel L. Harringa
Attorney, Agent, or Firm—J. D. Crane; F. L. Masselle; E. T. Grimes

[57] ABSTRACT

In a grating spectrometer a signal spectrum is measured repeatedly while inserting different filters. The number of the filters and measurements correspond to the number of the occurring grating orders not suppressed. The signal spectra and the transmission characteristics of the filters are stored. A system of equations is achieved, from which a computer calculates the signal partial spectra associated with the individual grating orders. A total spectrum is composed from these signal partial spectra. Separation of the higher grating orders need not be effected optically, for example by cut-off filters.

3 Claims, 2 Drawing Figures

GRATING SPECTROMETER

BACKGROUND OF THE INVENTION

The present invention generally relates to a grating spectrometer, and, in particular, relates to a grating spectrometer including several grating orders.

A conventional grating spectrometer includes a grating arrangement with a diffraction grating, which has a plurality of grating grooves extending closely side by side and onto which an incident light beam enters through an entrance slit, is collimated and is directed by a suitable optical system. The light returned by a diffraction grating is spectrally dispersed. Light of a different wavelengths is returned by angles for which the optical wavelength difference of the light diffracted at the grating grooves amounts to an integral multiple of the wavelength. The light of each wavelength is thus returned at different angles corresponding to optical wavelength differences of, integer, i.e., one, two, three etc., wavelength multiples. An incident white parallel light beam is therefore dispersed into parallel light beams of different colors, i.e., corresponding to different wavelengths, and returned at different angles. Several of such light beams, which correspond to path length differences of the single, double, triple etc. of the wavelength, are thereby associated with each wavelength. These different diffracted light beams of a wavelength are generally called "grating orders". Light at a particular wavelength $\lambda$ in the first grating order is diffracted by a grating in a particular direction. Light at a wavelength $\lambda/2, \lambda/3, \lambda/4 \ldots$ is also diffracted in the same direction as for light at the wavelength $\lambda$. These added components are said to be in the second, third, fourth . . . grating order.

The diffracted light beams are focused by an optical system, such that, in the plane of an exit slit, a spectrum is generated which is composed of real images of the entrance slit generated by the light beams of different colors. The exit slit permits passage of light therethrough, which light has been diffracted in a certain direction and which is focused by the optical system at the location of the exit slit. The light emerging through the exit slit is directed to a detector. By rotating the diffraction grating the spectrum is scanned. That is, the light beams diffracted into the different directions can be directed consecutively to the exit slit.

Spectrometers in which the diffracted light beams are focused by the optical system onto a diode array are also known. In this type of spectrometer a plurality of photodiodes are arranged closely side by side. When such a diode array is used the spectrum is not scanned, but the different wavelengths are simultaneously detected and the associated detector signals are output in parallel.

Of course, it is desired to measure only light of one wavelength, i.e., to detect only one grating order. Usually only the first grating order is used. The undesired grating orders thus have to be suppressed. This can be achieved by a cut-off filter or by a prism pre-monochomator. In the UV air is effective as a suitable cut-off filter.

In the first grating order a filter may be used for nearly a complete octave before a higher grating order occurs and the filter has to be changed. A single diffraction grating however may sweep more than two octaves, for example, the spectral range from 190 nm to 900 nm. This large spectral range requires a correspondingly large number of filters, each of which have to be consecutively rotated into the path of rays. Each filter change varies the optical conditions, such that filter steps or filter spikes easily occur in the 100%, or first order-line.

It is known to reduce such filter spikes by stopping the wavelength advance and the pen and by making the filter change during the recording intermission. A considerable expenditure is however required to automatically cause these recording intermissions. Further, the recording time required for scanning a spectrum in the wavelength range is undesirably extended. Finally, the stray light varies stepwise with each filter change. With high sample extinction steps may then easily occur in the recording, even if the 100% or first order-line does not have any steps.

Another disadvantage of a diffraction grating, which is used in the first grating order through a large wavelength range, is the low efficiency of the diffraction grating near the range ends. This reduction of the efficiency often coincides with a decrease of the spectral lamp intensity or of the spectral detector sensitivity.

It is known to use the diffraction grating in a relatively long wave partial range in the first grating order, and in a relatively short wave partial range in a second grating order. This requires, however, a more frequent filter change and the use of band pass filters.

When a diode array is used as a detector, one octave, at best, is detected thereby, and the higher grating orders have to be suppressed by a cut-off filter. As the slopes of the cut-off filter are not infinitely steep, the range, which may be detected by the diode array at once, is even smaller than one octave. In order to measure a larger spectral range with such a detector arrangement it is thus necessary to record the spectrum section by section and to rotate the diffraction grating inbetween.

SUMMARY OF THE INVENTION

Accordingly, it is one object of the present invention to form a grating spectrometer such that the entire examined spectral range is measured with a filter, such that no steps occur when the filter is changed.

This object is achieved, at least in part, by providing a memory means for storing the transmission characteristics of the different filters, means for measuring the signal spectra obtained with each of the filters by the different superposed grating orders, memory means for storing the signal spectra thus obtained, and computer means to which the stored transmission characteristics and the stored signal spectra are applied, and which supplies a signal spectrum in accordance with the spectral composition of the incident light beam.

Thereby largely any kind of filters may be used, provided the transmission characteristics are sufficiently different. One of the filters may also be a 100%-filter, which means that operation is without a physical filter. It is not the purpose of the filters to separate the grating orders from each other. A single filter is used with each measurement of the spectrum. Thus, several grating orders are superposed.

The spectrum proper is preferably formed by the computer means as a function of the wavelength from the signals of the detector arrangement, which signals are obtained with the several scannings or measurements with the different filters, and from known transmission characteristics of the filters, which have been previously measured and stored. Thereby the signal components resulting from the second, third, etc. grating orders are processed, such that altogether a larger wavelength range is detected than would be measured with the grating and detector arrangement in first order.

BRIEF DESCRIPTION OF THE DRAWING

One embodiment of the invention is described in greater detail with reference to the accompanying drawings, not drawn to scale and include.

DETAILED DESCRIPTION OF THE INVENTION

Figure 1:
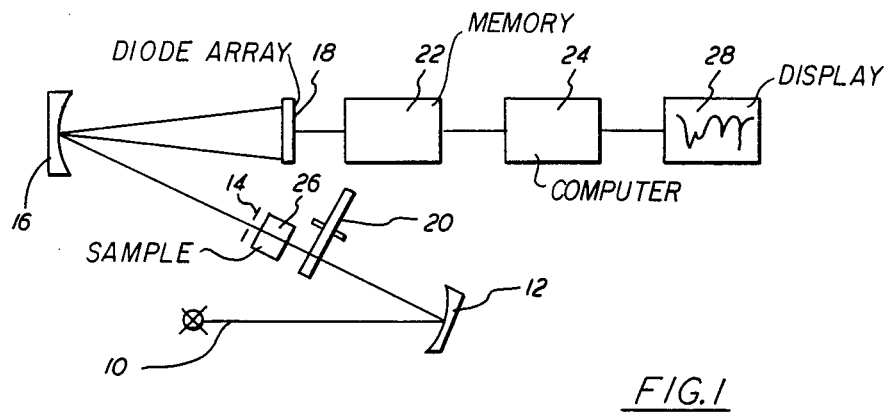
FIG. 1, which is a schematic illustration of a grating spectrometer.

A grating spectrometer is schematically illustrated in FIG. 1 and embodies the principles of the present invention. Therein, a light source 10 is imaged by, for example, a spherical mirror 12 on an entrance slit 14. A concave grating 16 images the entrance slit 14 as a function of wavelength on a diode array 18. A filter wheel 20 is arranged between the spherical mirror 12 and the entrance slit 14. The filter wheel 20, in this embodiment, includes four different filters, which are consecutively rotated into the path of rays.

The grating spectrometer generates, on the diode array 18, for example, a spectrum in the first grating order from 450 nm to 900 nm. Simultaneously, a spectrum of the second grating order, from 225 nm to 450 nm, and a spectrum of the third grating order, from 150 nm to 300 nm, fall on the diode array. However, the range from 150 nm to 190 nm is absorbed by the atmosphere. Finally, a spectrum of the fourth grating order from 190 nm to 225 nm falls on the diode array 18 taking into account the atmospheric absorption. The fifth grating order, the largest wavelength of which is 180 nm, is completely absorbed by atmosphere.

Figure 2:
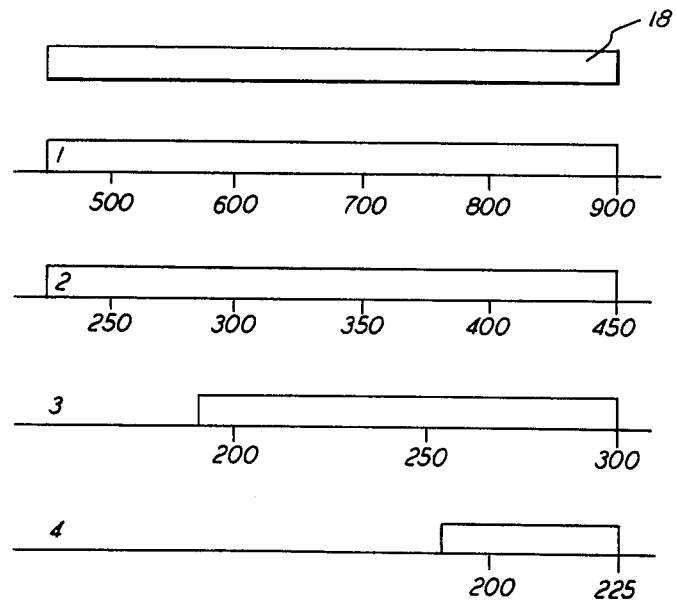
FIG. 2 showing how the different grating orders fall on a diode array serving as detector arrangement.

In FIG. 2 it is shown how the four grating orders fall on the diode array 18. In a left partial range of the diode array 18 two grating orders, that is the first and second grating order, simultaneously impinge on each detector element. In a median partial range of the diode array 18, three grating orders, i.e., the first three grating orders, simultaneously impinge on each detector element. Finally, in a right partial range four grating orders, namely the first four grating order, are detected simultaneously.

Thus, all four grating orders simultaneously impinge on the diode array 18. Radiation of two or more wavelengths, namely $\lambda$ and $\lambda/2$ as well as $\lambda/3$ and $\lambda/4$, if present, impinge on a detector element. The four components have to be separated. This is accomplished by the four filters of the filter wheel 20. These filters, however, need not separate the four grating orders individually as in conventional grating spectrometers. Thus, steep cut-off, or band, filters are not required. The spectral transmission characteristics of the filters may be selected substantially arbitrarily.

The transmissions of the four filters as functions of the wavelength $\lambda$ are $T_1(\lambda)$, $T_2(\lambda)$, $T_3(\lambda)$ and $T_4(\lambda)$. The detector signal, which is generated by the radiation of the first grating order without filter and which is proportional to the radiation flux and the detector sensitivity, is $S_1(\lambda)$. The wavelength $\lambda$ overlaps the range from 450 nm to 900 nm. The detector signal generated by the radiation of the second grating order without filter is $S_2(\lambda)$ the range of the wavelength $\lambda$ extending from 225 nm to 450 nm. The detector signal generated by the radiation of the third grating order without filter is $S_3(\lambda)$ in the range of the wavelength $\lambda$ from 150 nm to 300 nm. The detector signal generated by the radiation of the fourth grating order without filter is $S_4(\lambda)$ in the range of the wavelength $\lambda$ from 112.5 nm to 225 nm. The functions $S_3(\lambda)$ and $S_4(\lambda)$ have the value 0 up to about the wavelength $\lambda = 190$ nm because of the atmospheric absorption.

The detector elements of the diode array 18 are characterized hereinbelow by the wavelength $\lambda$ of the radiation of the first grating order, falling on the specific detector element, as illustrated in FIG. 2. With the filters of the filter wheel 20 inserted in the path of rays the following detector signals are achieved for the four filters.

$$S_1'(\lambda) = T_1(\lambda)S_1(\lambda) + T_1\left(\frac{\lambda}{2}\right) S_2\left(\frac{\lambda}{2}\right) +$$

$$T_1\left(\frac{\lambda}{3}\right) S_3\left(\frac{\lambda}{3}\right) + T_1\left(\frac{\lambda}{4}\right) S_4\left(\frac{\lambda}{4}\right)$$

$$S_2'(\lambda) = T_2(\lambda)S_1(\lambda) + T_2\left(\frac{\lambda}{2}\right) S_2\left(\frac{\lambda}{2}\right) +$$

$$T_2\left(\frac{\lambda}{3}\right) S_3\left(\frac{\lambda}{3}\right) + T_2\left(\frac{\lambda}{4}\right) S_4\left(\frac{\lambda}{4}\right)$$

$$S_3'(\lambda) = T_3(\lambda)S_1(\lambda) + T_3\left(\frac{\lambda}{2}\right) S_2\left(\frac{\lambda}{2}\right) +$$

$$T_3\left(\frac{\lambda}{3}\right) S_3\left(\frac{\lambda}{3}\right) + T_3\left(\frac{\lambda}{4}\right) S_4\left(\frac{\lambda}{4}\right)$$

$$S_4'(\lambda) = T_4(\lambda)S_1(\lambda) + T_4\left(\frac{\lambda}{2}\right) S_2\left(\frac{\lambda}{2}\right) +$$

$$T_4\left(\frac{\lambda}{3}\right) S_3\left(\frac{\lambda}{3}\right) + T_4\left(\frac{\lambda}{4}\right) S_4\left(\frac{\lambda}{4}\right)$$

Therein the functions $T_1$, $T_2$, $T_3$ and $T_4$ are known and the $S_1'$, $S_2'$, $S_3'$ and $S_4'$ are measured. Thus, for each $\lambda$, that is for each detector element, of the diode array 18, a system of four equations is obtained for the four unknown quantities, namely the signal components $S_1(\lambda)$, $S_2(\lambda/2)$, $S_3(\lambda/3)$ and $S_4(\lambda/4)$ of the four grating orders in the detector signal of the detector element characterized by $\lambda$. Therefrom these signal components may be resolved in a known way, for example, by the use of determinants.

The resolution of the system of equations is only possible if the determinant formed of the sixteen T-values is not zero. Thus, the transmission characteristics of the filters must be selected such that this is ensured. However, this is an easily met requirement.

Nevertheless, care should be taken that the determinant does not become too small. The differences in the shape of the transmission characteristics or in the linear combinations of transmission characteristics must not become too small.

Generally these conditions are easily met with relatively inexpensive glass filters.

The four filters are consecutively rotated, by the filter wheel, into the path of rays. The signal spectrum $S_1'(\lambda)$ associated with each filter is detected by the diode array 18. These signal spectra are stored in a memory 22. Also, the functions $T_1(\lambda)$, $T_2(\lambda)$, $T_3(\lambda)$ and $T_4(\lambda)$ are stored in the memory 22. The signal spectra $S_1'(\lambda)$ and the functions $T_1(\lambda)$ are supplied to a computer 24. The computer 24 resolves the system of equations indicated above. In the examples mentioned four signal partial spectra are obtained:

$S_1(\lambda)$ for $\lambda = 450$ nm to $\lambda = 900$ nm
$S_2(\lambda)$ for $\lambda = 225$ nm to $\lambda = 450$ nm
$S_3(\lambda)$ for $\lambda = 150$ nm to $\lambda = 300$ nm
$S_4(\lambda)$ for $\lambda = 112.5$ nm to $\lambda = 225$ nm Therein the last two partial spectra have the value of zero up to about $\lambda = 190$ nm. A continuous signal spectrum from $\lambda = 190$ nm to $\lambda = 900$ nm is desired. The two first signal partial spectra follow each other seamlessly. The wavelength range, for example, for the first signal partial spectrum can be made to begin with $\lambda = 451$ nm. The connection may, however, also be established in the way described hereinbelow for the other signal partial spectra.

The second and third signal partial spectra $S_2(\lambda)$ to $S_3(\lambda)$ overlap in the range from 225 nm to 300 nm. This overlap may be treated in different ways. For example, the signal partial spectrum $S_2(\lambda)$ may be evaluated completely, while the signal partial spectrum $S_3(\lambda)$ is evaluated only up to the wavelength of $\lambda = 225$ nm. Then the range from 225 nm to 300 nm is not taken into consideration in the third signal partial spectrum $S_3(\lambda)$. Of course, it is possible to utilize the signal partial spectrum $S_3(\lambda)$ completely while in the signal partial spectrum $S_2(\lambda)$ a wavelength range is omitted. It is also possible to position the transition point somewhere in the overlapping range. The mean value of the two signal partial spectra may also be formed in the overlapping range to use both sets of information. In order to avoid steps in the signal spectrum obtained, one signal partial spectrum $S_2(\lambda)$ may be weighted in the overlapping range with a weight increasing with the wavelength $\lambda$. The other signal partial spectrum $S_3(\lambda)$ may be weighted with a weight factor decreasing with the wavelength $\lambda$, when forming the mean value. Such a continuous transition is particularly advantageous when the stray light influences are different in the overlapping partial ranges and steps with high sample extinctions are to be avoided. The same methods may be used in the overlapping range of the two signal partial ranges $S_3(\lambda)$ and $S_4(\lambda)$.

The transmission spectrum of a sample 26 (FIG. 1) may be determined in a known way by obtaining the signal spectrum $S(\lambda)$ once without a sample 26 (as $S_0(\lambda)$) and once with a sample 26 in the manner described. The two signal spectra $S(\lambda)$ and $S_0(\lambda)$ thus obtained are divided. The transmission spectrum $T(\lambda)$ of the sample results from $$T(\lambda) = S(\lambda)/S_0(\lambda)$$

This operation is preferably carried out by the computer 24. The transmission spectrum $T(\lambda)$ is displayed on a display 28.

In the example described, the fifth and all higher grating orders were not present, beause they are absorbed by the atmosphere which acts as a cut-off filter. Without such a cut-off filter or a limitation acting in this way as, for example, the spectral emission limit of the lamp or the spectral sensitivity limit of the detector in the short wave range, infinitely many more grating orders are introduced. To separate the individual grating orders by computation, infinitely many spectra detected with infinitely many filters would then be required. All grating order impinging on the detector generate signals and must be separated by computation, also if they impinge in spectral range, which are of no interest for the desired spectrum. On the other hand all wavelengths of the desired spectral range have to be contained in the incident radiation. The more extensive the computation becomes, the more grating orders have to be taken into consideration. Therefore, it is often necessary to provide an additional filter in the path of rays which limits the number of the occurring grating orders.

The effective spectral range has to be limited, in any case, towards the short wave range, while generally a limitation towards the long wave range is not required. Such a limitation becomes necessary, when low grating orders have to be suppressed, to utilize the higher resolution of the higher grating orders. In this case a band filter is preferred. Then the measurement of the signal spectra $S_1'(\lambda)$ and $S_2'(\lambda)$ is carried out with, for example, two filters with the transmission characteristics $T_1(\lambda)$ and $T_2(\lambda)$, from which signal spectra the signal spectra $S_2(\lambda/2)$ and $S_2(\lambda/3)$ are determined from the system of equations $$S'_1(\lambda) = T_1(\lambda/2)S_1(\lambda/2) + T_1(\lambda/3)S_2(\lambda/3)$$

$$S'_2(\lambda) = T_2(\lambda/2)S_1(\lambda/2) + T_2(\lambda/3)S_2(\lambda/3).$$

Instead of with the detector arrangement described with a diode array the present invention may also be utilized in a conventional grating spectrometer with a single detector and scanning the spectrum by rotating the diffraction grating. In particular, the present invention can also be adapted for grating spectrometers with rapid cyclic spectral scanning.

To reduce the noise level several signal spectra can be detected and averaged during several rotations of the filter wheel. The stored transmission characteristics $T_1(\lambda)$ of the filters can be determined once with a conventional spectrometer and stored by the manufacturer of the instrument in the memory 22. Also the grating spectrometer itself can serve to determine the transmission characteristics. For this purpose, the filter wheel 20 can include, in one position thereof, an empty opening. The signal spectra determined with the individual filters are then divided by the signal spectrum obtained with the empty opening, whereby the transmissions of the filters are provided.

A large spectral range is detected with a grating spectrometer by evaluating the different grating orders. The diffraction grating operates in a small spectral range only, in each grating order, in which the range the efficiency of the diffraction grating does not yet decrease essentially. The mechanical requirements on the accuracy of the structure are small. The only movable part is a rotating filter wheel. The filter wheel includes only inexpensive colored glass filters.

The embodiments described herein are for exemplary purposes and are not considered limiting as other arrangements can be made without departing from the spirit and scope of the present invention. Thus, the present invention is deemed limited only by the appended claims and the reasonable interpretation thereof.

What is claim is:

1. A grating spectrometer, the grating of which is used in several grating orders, comprising, in combination:
    a grating for spectrally dispersing light incident thereon;
    a light source for emitting light onto said grating;
    a plurality of filters disposed on a filter changing device, each said filter having a known transmission characteristic, said filter changing device being operative to consecutively position each said filter in the path between said light source and said grating;
    detector means disposed to intercept light dispersed from said grating;
    a memory means responsive to said detector means to store spectra data from said detector means while each said filter is disposed in the path between said source and said grating, said memory means also storing transmission characteristic data for each said filter; and
    computer means, to which said stored transmission characteristics of each said filter and said stored signal spectra data are applied from said memory means, said computer means calculating, as a function of wavelength, a signal spectrum having the spectral composition of said incident light beam.

2. Grating spectrometer as claimed in claim 1 wherein said detector means is a diode array.

3. Grating spectrometer as claimed in claim 1 wherein said computer means solves a system of equations $$S_i'(\lambda) = \sum_{k=1}^{n} T_i\left(\frac{\lambda}{k}\right) S_k\left(\frac{\lambda}{k}\right)$$

$$i = 1 \ldots n$$

with respect to the $S_k$ for different $\lambda$ and wherein,
n = the number of the used filters and simultaneously the number of the occurring grating orders;
i = a running number associated with each filter;
$\lambda$ = the wavelength detected by the detector in the first grating order;
$S_i'(\lambda)$ = the signal spectrum obtained with filter 'i';
$T_i$ = the transmission characteristic of the filter 'i'; and
$S_k(\lambda/k)$ = the signal partial spectrum of the light impinging onto the detector in the $k^{th}$ grating order.

* * * * *